FIG. I.

United States Patent Office 3,560,338
Patented Feb. 2, 1971

3,560,338
GAS-COOLED NUCLEAR REACTORS
Gordon Brown, Sutton, England, assignor to Atomic Power Constructions Limited, Sutton, Surrey, England, a British company
Filed Feb. 9, 1968, Ser. No. 704,431
Int. Cl. G21c 15/00
U.S. Cl. 176—59         11 Claims

ABSTRACT OF THE DISCLOSURE

A nuclear reactor having a core entirely surrounded by a gas tight partition, which partition is located within and completely separated from a pressure vessel, the core is supported upon a lattice supporting structure, which contains a plenum chamber, heat exchangers are situated between the partition and the pressure vessel, and coolant gas is circulated from the plenum chamber up through fuel channels in the core down through the heat exchangers, part of the coolant flowing directly into the plenum chamber to join the remainder which passes up the side of the core and down through passageways in the core to the plenum chamber.

BACKGROUND OF THE INVENTION

This invention relates to gas-cooled nuclear reactors.

One form of gas-cooled nuclear reactor comprises a concrete pressure vessel containing a graphite-moderated core, heat exchangers around the core, and an inverted cup-shaped partition which is sealed at its lower end to an inner membrane of the vessel and separates the core from the heat exchangers. Core coolant gas is circulated through inlet openings in the partition, upwardly through fuel channels in the core, through outlet openings at the top of the partition, downwardly over the heat exchangers to the inlet openings once more. A more recent development of this type of gas-cooled graphite moderated nuclear reactor uses re-entrant core coolant gas flow wherein in order to maintain the graphite of the core at a tolerable temperature a portion of the core coolant gas from the heat exchangers is passed downwardly through the graphite of the core to combine with the remainder of the coolant gas before entering the fuel channels.

With this form of reactor it is necessary to provide a reliable seal between the partition and the pressure vessel membrane floor and whilst it is possible to do this it has been found to lead to some complication in shielding. Furthermore, a flexible seal is necessary to accommodate differential movements between the partition and the pressure vessel and this gives rise to complication and expense.

SUMMARY OF THE INVENTION

By the present invention there is provided a gas-cooled, nuclear reactor which includes a pressure vessel partitioning means within the vessel which divide the interior thereof to provide an inner chamber spaced from the inner surface or surfaces of the pressure vessel by an outer chamber which extends completely around the partitioning means, a core supporting structure having gas passages through it extends across the inner chamber to form a plenum chamber from a lower end portion of the inner chamber, a core disposed upon the supporting structure, heat exchangers disposed around the partitioning in the outer chamber, gas outlet openings in an upper portion of the partitioning means, gas inlet openings in the partitioning, and means for circulating a core coolant gas through the gas inlet openings to the plenum chamber, upwardly through the core supporting structure and through fuel channels in the core, out of the gas outlet openings to the upper end of the outer chamber, and downwardly over the heat exchangers to the gas inlet opening once more.

The gas outlet openings may be the bores of a plurality of charge tubes extending from the outside of the pressure vessel into the inner chambers. The charge tubes enable nuclear fuel to pass to and from the core and have apertures in their walls for the passage of coolant from the bores to the upper end of the outer chamber.

The core is normally disposed within a radiation shield which is also located within the partitioning means. The core supporting structure which supports the partitioning means includes a lattice structure having openings in which is disposed the bottom wall of the radiation shield. The bottom wall is disposed above portions of the openings which provide the plenum chamber whilst the lattice structure is sealed beneath the plenum chamber by plates which provide the bottom wall of the partitioning means.

There may be a second plenum chamber disposed beneath the lattice structure and the core. In one embodiment of the invention the second chamber is provided by spacing the lattice structure from the core. The spacing may be effected by a plurality of levelling screws.

A pathway may be provided for circulating a portion of the coolant gas upwardly between the partitioning and the shield, downwardly through the upper end of the shield and through the core and for combining the portion with the remainder of the flow of coolant gas where the coolant gas enters the fuel channels in the core.

Means may be provided for controlling the volume of coolant gas passing upwardly between the partitioning and the shield.

DESCRIPTION OF THE PREFERRED EMBODIMENT

Figure 1:
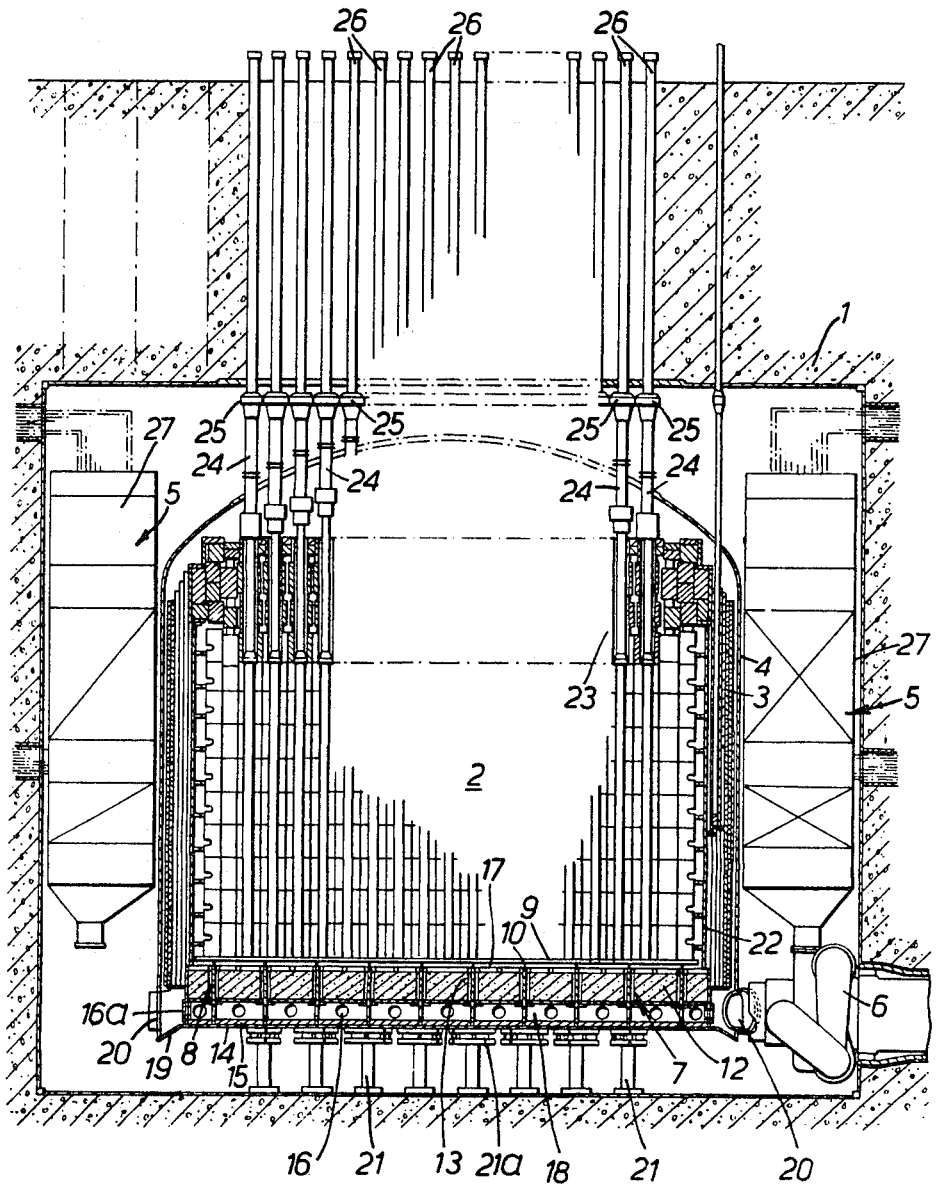
FIG. 1 is a sectional side view of a gas-cooled, graphite moderated nuclear reactor.
Figure 2:
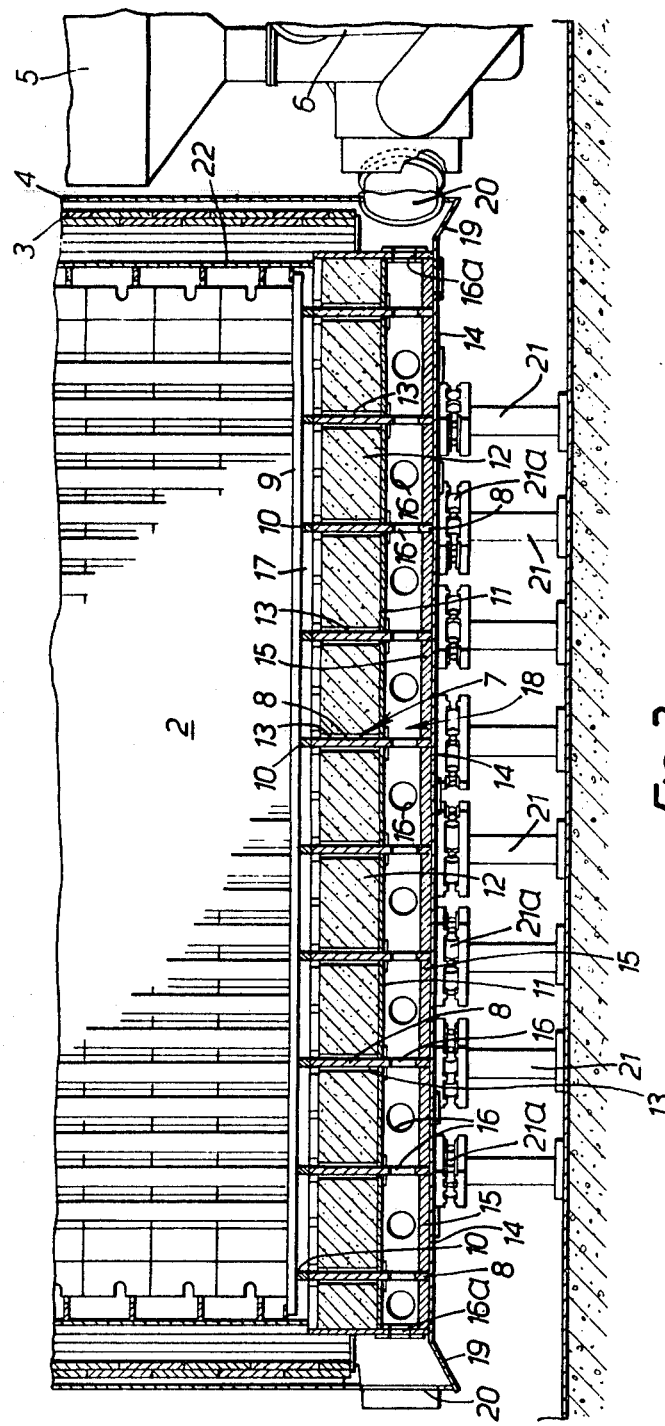
FIG. 2 is an enlarged side view of the bottom part of FIG. 1.

The drawing shows a metal-lined concrete pressure vessel 1 containing a graphite moderated core 2, radiation shield 3 of inverted cup-shaped form, a partition 4 with a dome-shaped upper wall, heat exchangers 5, and a plurality of core coolant gas circulator assemblies each associated with one of the heat exchangers of which only one is shown and is designated 6.

The core 2 is of a known type for use with the so-called re-entrant coolant gas flow and is composed of graphite blocks having upwardly extending fuel channels through which coolant gas may flow in an upward direction from inlet openings at the lower ends thereof, and downwardly extending coolant gas flow paths around the fuel channels and between the graphite blocks through which coolant gas may flow in a downward direction. The core 2 is supported upon a base 7 comprising a lattice structure of metal beams 8 which support the core on a platform 9 by means of levelling screws 10. The platform 9 is composed of a plurality of levelling plates (not shown) provided with openings to permit coolant gas to pass therethrough from a space 17 which forms a plenum chamber. A plurality of plates 11 extend between and are supported by the beams 8 to provide supports for radiation shield 12 disposed in the spaces between the beams 8. The radiation shield 12 comprises a plurality of columns (not shown) each composed of graphite blocks placed one upon another. The radiation shield 12 is spaced from the beams 8 to provide upwardly extending coolant gas passages 13 along the beams 8. The plates 11 are provided with openings (not shown) which permit coolant gas to pass to the passages 13.

The lower ends of the beams 8 are sealed to one another by plates 14 which provide a bottom wall for the partition 4. The plates 14 each have a steel plate 15 resting thereon which provides further radiation shielding. Each of the beams 8 has a plurality of openings 16 which connect the compartments in the lattice structure to one another to form a plenum chamber 18. The openings 16a in the outermost beams 8 are each fitted with a known type of gas throttline device for adjusting the rate at which gas passes through the openings 16a. The plates 14 are sealed to the upwardly extending cylindrical wall of the partition 4 by plates 19.

The lower end of the side wall of the partition 4 has a plurality of openings 20 each of which is connected to the outlet of one of the gas circulating assemblies 6.

The base 7 is supported on columns 21 by roller assemblies 21a which allow relative movements between the base 7 and columns 21 to accommodate thermal expansions and contraction of the base 7.

The radiation shield 3 is disposed around a metal cylinder 22 which is sealed to the platform 9. The radiation shield 3 is of a known graphite block construction wherein sinuous coolant gas passages exist which extend through the upper wall 23 of the radiation shield 3 without providing straight paths through the upper wall 23 along which radiation may pass. The partition 4 and radiation shield 3 are spaced from one another to provide an upward coolant gas flow path between them from the openings 20.

Extending through the upper end of the partition 4 and radiation shield upper wall 23 is a plurality of charge tubes 24, each of which is aligned with one of the fuel channels in the core 2. Each charge tube 24 has a gas outlet 25 and the core of each charge tube 24 is sealed above its gas outlet 25 when the reactor is operating. Each charge tube 24 has a standpipe 26 aligned therewith through which nuclear fuel elements may be passed to and from the associated fuel channel via the associated charge tube 24.

Each heat exchanger 5 comprises banks of heat exchanger tubes (not shown) for vapour generating, superheating and reheating. The banks of heat exchange tubes of each heat exchanger 5 are within a casing 27 which is open at the top and has an opening at the bottom which is sealed to a coolant gas inlet to the core coolant gas circulator assembly 6 associated therewith.

In operation, core coolant gas is circulated by the core coolant gas circulator assemblies 6 through the openings 20 from whence a portion of the core coolant gas enters the openings 16a fitted with gas throttling devices whilst the remaining core coolant gas passes upwardly between the radiation shield 3 and the partition 4. The core coolant gas entering the openings 16a passes into the plenum chamber 18, flows upwardly through the passages 13 to the plenum chamber 17, and then enters the fuel channels in the core 2. The portion of the core coolant gas passing upwardly between the radiation shield 3 and the partition 4 flows over the upper wall 23 of the radiation shield 3 and passes downwardly along the coolant gas passages therein. This portion of the core coolant gas continues downwardly along the coolant gas flow paths in the core 2 to combine with the core coolant gas from the plenum chamber 17 at the inlets to the fuel channels.

The combined portions of the core coolant gas then pass upwardly along the fuel channels around fuel elements therein and are heated by the fuel elements. The heated core coolant gas continues upwardly along the bores of the charge tubes 24 and emerges at the gas outlets 25. From the gas outlets 25 the core coolant gas flows downwardly over the partition 4 and enters the casings 27. The core coolant gas then flows through the casings 27 and heats the heat exchanger tubes therein by flowing over them. After heating the heat exchange tubes the core coolant enters the gas inlets to the coolant gas circulator assemblies and is returned by them to the openings 20 once more. The heated heat exchange tubes generate steam, superheat steam and reheat steam in the tube banks for these purposes.

The volume of core coolant gas passing upwardly between the radiation shield 3 and the partition 4 may be adjusted by means of the throttling devices in the openings 16a.

In a different embodiment of the present invention, the function of the throttling devices in the openings 16a is provided by a by-pass pipe containing a valve. The by-pass pipes are arranged externally of the bottom wall made up of the plates 14 and each communicates, at one end, with an associated opening in plate 19 and, at the other end, with an associated opening in a plate 14. The volume of coolant gas passing upwardly between the radiation shield and the partition 4 is then controlled by the setting of the valves in the by-pass pipes.

It will be appreciated that the core is contained within the partition 4 whose lower end is closed by the plates 14. The enclosure thus formed is not sealed to the pressure vessel membrane. Moreover, the enclosure is completely surrounded by the outer chamber.

I claim:

1. A gas cooled nuclear reactor comprising in combination,
   a pressure vessel,
   a core,
   partitioning means, and
   heat exchanger means,
   said pressure vessel housing said partitioning means, and said partitioning means housing said core, said pressure vessel and said partitioning mean defining an outer chamber, and said partitioning means and said core defining an inner chamber, said outer chamber extending completely around said partitioning means, there being a plurality of gas outlet openings in the partitioning means,
   said reactor further including,
   a core supporting lattice structure, said lattice structure extending across the lower end of said inner chamber to define within said lattice structure a plenum chamber, a plurality of fuel channels in said core and gas circulating means to circulate coolant gas on a coolant gas path through said reactor, said gas path comprising a first portion passing downwardly through said core into said plenum chamber, and a second portion passing directly into said plenum chamber, said first and second portions combining in said plenum chamber to pass upwardly through said fuel channel in said core to extract heat therefrom through said gas outlet openings and into said outer chamber, through said heat exchangers and splitting to form said first and second portions.

2. The nuclear reactor of claim 1 wherein said gas outlet openings further comprise a plurality of charge tubes extending from the outside of said partitioning means into said inner chamber, said charge tubes having bores enabling nuclear fuel to pass to and from said core, and apertures in the walls of the charge tubes to form a gas path from said bores of said tubes to the upper end of said outer chamber.

3. A nuclear reactor as claimed in claim 1 wherein the core is disposed within a radiation shield, the radiation shield being within the partitioning means, in which the core supporting lattice structure is positioned on the partitioning means and includes a lattice structure, a bottom wall of the radiation shield being disposed in the openings of the lattice structure above portions of these openings which provide the plenum chamber, and in which the lattice structure is sealed beneath the plenum chamber by plates to provide the bottom wall of the partitioning means.

4. A nuclear reactor as claimed in claim 3 wherein a second plenum chamber is disposed between the lattice structure and the core.

5. A nuclear reactor as claimed in claim 4 wherein the core is spaced, by a plurality of levelling screws, from the lattice structure to provide the second plenum chamber.

6. A nuclear reactor as claimed in claim 3 wherein a pathway is provided for circulating a portion of the coolant gas upwardly between the partitioning and the shield, downwardly through the upper end of the shield and through the core, and for combining said portion of the coolant gas with the remainder where the coolant gas enters the fuel channels in the core.

7. A nuclear reactor as claimed in claim 6 wherein means are provided for controlling the volume of coolant gas passing upwardly between the partitioning and the shield.

8. A nuclear reactor as claimed in claim 4 wherein a pathway is provided for circulating a portion of the coolant gas upwardly between the partitioning and the shield, downwardly through the upper end of the shield and through the core, and for combining said portion of the coolant gas with the remainder where the coolant gas enters the fuel channels in the core.

9. A nuclear reactor as claimed in claim 5 wherein a pathway is provided for circulating a portion of the coolant gas upwardly between the partitioning and the shield, downwardly through the upper end of the shield and through the core, and for combining said portion of the coolant gas with the remainder where the coolant gas enters the fuel channels in the core.

10. A nuclear reactor as claimed in claim 8 wherein means are provided for controlling the volume of coolant gas passing upwardly between the partitioning and the shield.

11. A nuclear reactor as claimed in claim 9 wherein means are provided for controlling the volume of coolant gas passing upwardly between the partitioning and the shield.

References Cited

UNITED STATES PATENTS

| | | | |
|---|---|---|---|
| 3,201,321 | 8/1965 | Fortescue et al. | 176—59 |
| 3,342,691 | 9/1967 | Warner et al. | 176—60 |

FOREIGN PATENTS

| | | | |
|---|---|---|---|
| 1,452,298 | 8/1966 | France | 176—60 |
| 1,483,407 | 4/1967 | France | 176—59 |

REUBEN EPSTEIN, Primary Examiner

U.S. Cl. X.R.

176—60